United States Patent [19]

Levine et al.

[11] 4,152,502

[45] May 1, 1979

[54] TITANIUM-MODIFIED SILYL CHROMATE CATALYSTS FOR ETHYLENE POLYMERIZATION

[75] Inventors: Isaac J. Levine; Frederick J. Karol, both of Belle Mead, N.J.

[73] Assignee: Union Carbide Corporation, New York, N.Y.

[21] Appl. No.: 895,662

[22] Filed: Apr. 12, 1978

Related U.S. Application Data

[62] Division of Ser. No. 761,213, Jan. 21, 1977, Pat. No. 4,100,105.

[51] Int. Cl.$^2$ .................. C08F 4/02; C08F 4/22; C08F 4/78; C08F 10/00
[52] U.S. Cl. ........................................ 526/96; 526/97; 526/113; 526/114; 526/129; 526/130; 526/169; 526/172; 526/348; 526/348.5; 526/348.6
[58] Field of Search ............... 526/96, 97, 113, 114, 526/129, 130, 169, 172

[56] References Cited

U.S. PATENT DOCUMENTS

| | | | |
|---|---|---|---|
| 3,324,095 | 6/1967 | Carrick et al. | 260/88.2 |
| 3,324,101 | 6/1967 | Baker et al. | 260/94.9 |
| 3,445,367 | 5/1969 | Kallenbach | 526/96 |
| 3,622,521 | 11/1971 | Hogan et al. | 252/430 |
| 3,704,287 | 11/1972 | Johnson | 526/129 |
| 3,870,656 | 3/1975 | Brown et al. | 252/451 |
| 3,879,362 | 4/1975 | Chalfont et al. | 526/113 |
| 3,950,316 | 4/1976 | Witt | 526/113 |
| 3,974,101 | 8/1976 | Witt | 252/458 |
| 3,984,351 | 10/1976 | Rekers et al. | 252/430 |
| 4,011,382 | 3/1977 | Levine et al. | 526/106 |
| 4,049,896 | 9/1977 | Rekers et al. | 526/129 |
| 4,053,437 | 10/1977 | Liu et al. | 526/96 |
| 4,065,612 | 12/1977 | Hamer et al. | 526/114 |

FOREIGN PATENT DOCUMENTS

1520444 12/1969 Fed. Rep. of Germany.
1447605 8/1976 United Kingdom.

*Primary Examiner*—Alan Holler
*Attorney, Agent, or Firm*—Bernard Francis Crowe

[57] ABSTRACT

A catalyst for the preparation of ethylene polymers having higher melt indexes comprises a silyl chromate deposited on a silica support containing both aluminum and titanium.

8 Claims, No Drawings

TITANIUM-MODIFIED SILYL CHROMATE CATALYSTS FOR ETHYLENE POLYMERIZATION

This is a division of Ser. No. 761,213 filed Jan. 21, 1977, U.S. Pat. No. 4,100,105.

BACKGROUND OF THE INVENTION

This invention pertains to ethylene polymerization catalysts and more particularly to a method for preparing silica supported silyl chromate polymerization catalysts.

An ethylene polymerization catalyst system based on silyl chromate compounds is disclosed in U.S. Pat. No. 3,324,101. However, the catalysts disclosed in this reference afford ethylene polymers with melt indexes lower than those desired for special applications.

Chromium oxide supported titanium-containing catalysts for ethylene polymerizations are known but they require activation by heating in an oxidizing atmosphere to a temperature above 300° C. and as high as 1000° C. This activation is carried out after deposition of the chromium oxide on the support. See for example U.S. Pat. No. 3,622,521 and Netherlands patent application No. 72-10881.

In the present invention the titanium/aluminum modified silica support is heated at elevated temperatures prior to deposition of the silyl chromate.

SUMMARY OF THE INVENTION

A catalyst for the preparation of polymers of ethylene alone or ethylene copolymerized with alphaolefins containing three to about six carbon atoms has been discovered which comprises a silyl chromate having the formula:

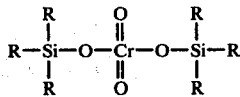

wherein R is a hydrocarbyl radical containing from 1 to about 14 carbon atoms adsorbed onto a high surface area silica support previously heat-treated to a temperature of about 500° to about 1000° C., containing both aluminum and titanium.

These catalysts can be used to prepare ethylene polymers having higher melt indexes than prior art catalysts.

In general the catalysts of this invention are prepared by heat treatment of a silica support containing both aluminum and titanium followed by deposition of a silyl chromate. No heat treatment of the catalyst is employed after deposition of the silyl chromate onto the silica support. The deposition of the silyl chromate onto the silica support is not narrowly critical. It has been found to be convenient to deposit the silyl chromate from a solution thereof in an organic solvent. Suitable organic solvents include alkanes having about 5 to 10 carbon atoms, such as, pentane, hexane, heptane, octane and the like; cycloalkanes having about 5 to 7 carbon atoms, such as, cyclopentane, cyclohexane and cycloheptane; and aromatics having 6 to about 12 carbon atoms, such as, benzene, toluene, xylene, ethyl benzene, and the like.

Representative high surface area silica supports include microspherodial intermediate density (MSID) silica having a surface area of 300 square meters per gram, a pore diameter of about 200 Å and an average particle size of about 70 microns (about 0.0028 inches), (W. R. Grace G-952 grade); intermediate density (ID) silica having a surface area of about 300 square meters per gram, and a pore diameter of about 160 Å and an average particle size of about 103 microns (about 0.0040 inches) (W. R. Grace G-56 grade); and Davison Grade 967 silica having a surface area of 400 square meters per gram and a pore volume of about 0.90 cc./g. Davison 967 grade silica contains about 13 weight percent aluminum oxide.

Aluminum can be introduced into the catalyst of this invention by choosing either a silica with chemically combined alumina present as in the case of the Davison 967 grade or by treating silica with a solution of an aluminum compound, such as aluminum nitrate.

The titanium compounds used for the preparation of the catalyst of this invention include those disclosed in U.S. Pat. No. 3,622,521 and Netherlands Patent Application No. 72-10881 (the disclosures of which publications are hereby incorporated by reference). These compounds include those having the structures:

and

wherein m is 1, 2, 3 or 4; n is 0, 1, 2, or 3 and m+n=4, R is a $C_1$ to $C_{12}$ alkyl, aryl or cycloalkyl group, and combinations thereof such as aralkyl, alkaryl, and the like; R' is R, cyclopentadienyl, and $C_2$ to $C_{12}$ alkenyl groups, such as ethenyl, propenyl, isopropenyl, butenyl, and the like; and

where X, a halogen atom, is fluorine, chlorine, bromine or iodine.

The titanium compounds include titanium tetrachloride, titanium tetraisopropoxide, titanium tetrabutoxide, and the like. The titanium compounds are more conveniently deposited on the silica support from a hydrocarbon solvent solution thereof.

The amount of titanium in the catalyst of this invention is about 2 weight percent to about 30 weight percent based on the weight of silica calculated as $TiO_2$.

Aluminum is incorporated into the silica support by treating said silica support with a solution of an aluminum compound or may be initially present in the silica precursor in the form of alumina. Although about 0.01 percent to about 50 weight percent of alumina can be present on the total support, it is preferred to employ supports containing about 0.05 to about 20 percent by weight of alumina based on the weight of support.

Although the R substituents in the silyl chromates of this invention can contain from 1 to about 14 carbon atoms, they preferably contain about 3 to about 10 carbon atoms. Illustrative of these hydrocarbon groups are methyl, ethyl, propyl, isopropyl, n-butyl, isobutyl, n-pentyl, isopentyl, t-pentyl, hexyl, 2-methylpentyl, decyl, tridecyl, tetradecyl, benzyl, phenylethyl, p-methylbenzyl, phenyl, tolyl, xylyl, naphthyl, ethylphenyl, methylnaphthyl, dimethylnaphthyl, and the like. Silyl chromates containing alkyl substituents are unstable although they can be used if proper precautions are taken. Illustrative of the preferred silyl chromates but by no means an exhaustive or complete list of those which can be employed in this invention are such compounds as:
- bis-triphenylsilylchromate,
- bis-tritolylsilylchromate,
- bis-trixylylsilyichromate,
- bis-trinaphthylsilylchromate, and
- polydiphenylsilylchromate.

With these catalysts the use of a fluoridation agent can optionally be employed to advantage where changes in molecular weight distribution and the rate of copolymerization of ethylene and a comonomer is desired. If a fluoridation agent is used, it is combined with the silica support prior to the deposition of silyl chromate. While up to about ten percent by weight of fluoridation agent, based on the weight of silica, can be used, it is preferred that about from 0.05 to about 1.0 percent by weight be used.

The fluorine compounds which may be used include HF, or any compound of fluorine which will yield HF under the conditions employed for the preparation of the catalyst. Fluorine compounds other than HF which may be used are disclosed in Netherlands Patent Application No. 72-10881. These compounds include ammonium hexafluorophosphate, ammonium hexafluorosilicate, ammonium tetrafluoroborate and ammonium hexafluorotitanate. The fluorine compounds are conveniently deposited on the silica support from an aqueous solution thereof or by dry blending the solid fluorine compounds with the other components of the catalyst during their preparation.

The invention is further described in the Examples which follow. All parts and percentages are by weight unless otherwise specified.

CONTROL 1

A. Silica Support Preparation

To solution of 1.5 g. of Al(NO$_3$)$_3$.9H$_2$O in 150 ml. of water there was added 20 g. of Polypor silica obtained from the National Petrochemical Company. This silica had a pore size of 250 to 270 Å and a surface area of 370 to 400 square meters per gram. The mixture was filtered and 74 ml. of filtrate recovered. The silica residue was then dried. A portion of dried residue was heated at 820° C. for 16 hours under nitrogen and cooled. The aluminum concentration of the resultant silica support, calculated at Al$_2$O$_3$, was 0.5% by weight.

B. Polymerization Catalyst Preparation

A polymerization catalyst was prepared by mixing 0.98 g. of the silica support prepared in the preceeding paragraph A with 50 ml. of n-hexane and 0.030 g. of bis-triphenylsilyl chromate. This mixture was stirred under nitrogen at ambient temperature for 1 hour. The resultant slurry was used as such as the polymerization catalyst.

C. Polymerization Catalyst Evaluation

The slurry from the preceeding paragraph B was charged to a stirred, high pressure reaction vessel, having a void of 1000 ml. together with 500 ml. of n-hexane and 40 ml. of 1-hexane. The vessel was then sealed and pressurized with ethylene to a pressure of 200 psig. Polymerization was allowed to take place at 86° C. for 75 minutes. A yield of 185 g. of ethylene copolymer was obtained having a melt index of 0.28 dg./min., a flow index of 11.7 dg./min., and a density of 0.939 g/cc.

CONTROL 2

Control 1 was repeated with the exception that 0.93 g. of silica support was used together with 0.030 g. of bis-triphenylsilyl chromate for the catalyst preparation. The 1-hexene was replaced by 20 psig of propylene. Using the same polymerization catalyst evaluation procedure a yield of 31 g. of ethylene copolymer was obtained after 110 minutes having a melt index of 2.69 dg./min., a flow index of 243 g./min. and a density of 0.904 g. cc.

CONTROL 3

Control 1 was repeated with the exception that 0.98 g. of the silica support was used together with 0.030 g. of bis-triphenylsilyl chromate for the catalyst preparation and no comonomer was used with the ethylene. Using the same catalyst evaluation procedure a yield of 159 g. of ethylene homopolymer was obtained after 105 minutes of polymerization. The homopolymer showed no melt index and a flow index of 1.0 dg./min.

EXAMPLE 1

A. Silica Support Preparation

To a solution of 1.50 grams of Al(NO$_3$)$_3$.9H$_2$O in 150 ml water, there was added 20 grams of Polypor silica described in Control 1. The mixture was filtered and 74 ml of filtrate recovered. The residue was then dried. A 9.3 gram sample of this residue which had been dried at 200° C. was slurried with 100 ml. of pentane and then combined with 2.8 grams of titanium tetraisopropoxide. The solvent was evaporated and the residue heated in an oxygen atmosphere at 810° C. for 17 hours affording the support. The Al content, calculated as Al$_2$O$_3$, was 0.5% and the Ti content, calculated as TiO$_2$, was 7.5%.

B. Polymerization Catalyst Preparation

A polymerization catalyst was prepared by mixing 1.0 g. of the silica support prepared in the preceeding paragraph A with 50 ml of n-hexane and 0.030 g. of bis-triphenylsilyl chromate. This mixture was stirred under nitrogen at ambient temperature for 1 hour. The resultant slurry was used as such as the polymerization catalyst.

C. Polymerization Catalyst Evaluation

The catalyst slurry from the preceeding paragraph B was charged to the stirred high pressure reaction vessel described in Control 1 together with 500 ml of hexane and 40 ml of 1-hexene. The vessel was then sealed and pressurized with ethylene to a pressure of 200 psig. Polymerization was allowed to proceed at 86° C. for 40 minutes. A yield of 136 g. of ethylene/1-hexene copolymer was obtained having a melt index of 2.81 dg./min., a flow index of 92.1 dg./min. and a density of 0.932 g./cc.

EXAMPLE 2

Example 1 was repeated using the same catalyst slurry but with the difference that the 1-hexene was replaced by charging 20 psig of propylene to the polymerization reactor. Polymerization was allowed to proceed for 90 minutes at 86° C. affording a yield of 99 g. of ethylene/propylene copolymer having a melt index of 27.5 dg./min. and a density of 0.895 g./cc.

EXAMPLE 3

A. Silica Support Preparation

A sample of the Polypor silica described in Control 1 was dried at 200° C. and 10.1 grams of this silica was then slurried with 100 ml. of pentane. To this slurry was added 0.115 grams of aluminum triisopropoxide in toluene solution followed by 3.0 grams of titanium tetraisopropoxide. The solvent was removed by evaporation and the residue heated at 770° C. for 16 hours in an oxygen atmosphere. The Al content, calculated as Al$_2$O$_3$, was 0.3 weight percent and the Ti content, calculated as TiO$_2$, was 7.6 weight percent.

B. Polymerization Catalyst Preparation

A polymerization catalyst was prepared by mixing 1.0 g. of the silica support from the preceeding paragraph A with 0.040 g. of bis-triphenylsilyl chromate and 50 ml of hexane. This mixture was stirred under nitrogen at ambient temperature for 1 hour. The resultant slurry was used as such as the polymerization catalyst.

C. Polymerization Catalyst Evaluation

The slurry from the preceeding paragraph B was charged to the reaction vessel described in Control 1 C together with 500 ml of n-hexane. The vessel was sealed and pressurized with ethylene to a pressure of 200 psig. After a polymerization time of 50 minutes at a polymerization temperature of 86° C., a yield of 108 g. of ethylene homopolymer was obtained having a flow index of 4.0 dg./min. There was no flow in the standard melt index test. Table 1 shows comparative data.

TABLE 1

| \ | COMPARISON OF CATALYSTS WITH AND WITHOUT TITANIUM | | | |
|---|---|---|---|---|
| Example No. | Titanium | Comonomer | Melt Index | Flow Index |
| Control 1 | No | 1-Hexene | 0.28 | 11.7 |
| 1 | Yes | 1-Hexene | 2.81 | 92.1 |
| Control 2 | No | Propylene | 2.69 | 243 |
| 2 | Yes | Propylene | 27.5 | — |
| Control 3 | No | None | no flow | 1.0 |
| 3 | Yes | None | no flow | 4.0 |

EXAMPLE 4

The procedure described in Example 3 was repeated with the exception that the catalyst slurry was prepared from 0.96 g. of the silica support from paragraph A together with 0.040 g. of bis-triphenylsilyl chromate and 30 psig of hydrogen was charged to the reaction vessel and the pressure raised to 200 psig with ethylene. Using a reaction temperature of 86° C. and a reaction time of 45 minutes, a yield of 17 g. of ethylene homopolymer was obtained having a melt index of 0.19 dg./min. and a flow index of 31.0 dg./min. Hydrogen increases the melt index of the resultant ethylene homopolymer.

EXAMPLE 5

A. Silica Support Preparation

The procedure described in Example 3 paragraph A was repeated with modifications consisting of using 9.0 g. of Polypor silica, 0.110 g. of aluminum triisopropoxide, 2.7 g. of titanium tetraisopropoxide and additionally 0.09 g. of ammonium hexafluorosilicate, (NH$_4$)$_2$SiF$_6$. This mixture was then heated at 750° C. under an oxygen atmosphere for 17 hours and then cooled. The silica support thus prepared had an aluminum content, calculated as Al$_2$O$_3$ of 0.3 weight percent and a titanium content, calculated as TiO$_2$, of 7.8 weight percent.

B. Polymerization Catalyst Preparation

A catalyst slurry was prepared using the procedure described in Example 1, paragraph B, using 0.93 g. of the silica support from paragraph A above, 50 ml of n-hexane and 0.04 g. of bis-triphenylsilyl chromate.

C. Polymerization Catalyst Evaluation

The catalyst slurry prepared in paragraph B above was charged to the reaction vessel described in Control 1 paragraph C together with 500 ml of n-hexane. The vessel was closed and pressurized to 200 psig with ethylene. After a reaction of 30 minutes at a polymerization temperature of 86° C., there was obtained a yield of 55 g. of ethylene homopolymer having no flow in the melt index test and a flow index of 9.5 dg./min.

EXAMPLE 6

A. Silica Support Preparation

A 967 grade of SiO$_2$-Al$_2$O$_3$ (12.8 g.) obtained from the Davison Chemical Company was dried at 200° C. and slurried with 100 ml of pentane. The slurry was then combined with 3.8 g. of titanium tetraisopropoxide. The solvent was removed and the residue heated in an atmosphere of oxygen at 750° C. for 17 hours and cooled. The resultant silica support had an aluminum content, calculated as Al$_2$O$_3$, of 13 weight percent and a titanium content, calculated as TiO$_2$, of 7.5 weight percent.

B. Polymerization Catalyst Preparation

A catalyst slurry was prepared using the procedure described in Example 1, paragraph B, using 1.0 g. of the silica support prepared in paragraph A above, 500 ml of n-hexane and 0.03 g. of bis-triphenylsilyl chromate.

C. Polymerization Catalyst Evaluation

The catalyst slurry prepared in paragraph B above was charged to the reaction vessel described in Control 1, paragraph C, together with 500 ml of n-hexane and 40 ml of 1-hexene. The vessel was sealed and pressurized with ethylene to a pressure of 200 psig. Polymerization was allowed to take place at 86° C. for 90 minutes. A yield of 80 g. of ethylene copolymer was obtained having a flow index of 3.4 dg./min. and a density of 0.933 g./cc. While the flow index of this copolymer is lower than that of the previous examples and Controls, it should be recognized that flow index is strongly influenced by inherent silica support physical structure. Thus the flow index will vary with the particular silica support one used to prepare the ethylene polymerization catalyst. However, the titanium modified silyl chromate catalysts on any given silica support will afford higher flow index ethylene polymers than catalysts prepared without titanium treatment.

EXAMPLE 7

The procedure described in Example 6 was followed with the exception that the 40 ml of 1-hexene was replaced by 20 psig of propylene as the ethylene comonomer. The reaction time again was 90 minutes affording a yield of 85 g. of ethylene/propylene copolymer having a melt index of 2.88 dg./min., a flow index of 137 dg./min. and a density of 0.905 g./cc.

EXAMPLE 8

Fluid Bed Polymerization of Ethylene

Using a fluid bed reactor and process as disclosed in U.S. Pat. No. 3,687,920, several runs were made demonstrating the utility of the silica supported silyl chromate catalysts of this invention for the polymerization of ethylene in a fluid bed reactor. Pertinent data obtained from these runs are delineated in Table II. The nature of the polymerization technique will also affect the flow index of the ethylene polymers obtained with the catalysts of this invention. Thus lower melt flow ethylene polymers are obtained in a fluid bed than in a slurry process.

The preparation of the catalysts used in these runs is given below.

Polypor silica (500 g.) was mixed with a solution of 18.7 g. of Al(NO$_3$)$_3$·9H$_2$O in 3 liters of water. The mixture was filtered and 1.5 liters of filtrate recovered. The residue dried at 200° C. was used as the catalyst support.

The dried support was slurried with isopentane and titanium tetraisopropoxide added, 35 g. for each 100 g. of support. The solvent was then evaporated. The residue was heat treated first at 150° C. under nitrogen for 2 hours, then at 300° C. under air for 2 hours and finally at 850° C. under air for 8 hours.

After cooling, 458 g. of heat treated support was slurried with isopentane and 18.4 g. of bis-triphenylsilyl chromate was added. After stirring for one hour, the solvent was evaporated.

TABLE II
USE OF TITANIUM-MODIFED SILYL CHROMATE CATALYSTS FOR ETHYLENE POLYMERIZATION IN FLUID BED

| REACTION CONDITIONS | RUN NUMBER | | | | |
|---|---|---|---|---|---|
| | 1 | 2 | 3 | 4 | 5 |
| Reactor Temp. °C. | 95 | 105 | 105 | 104.5 | 110 |
| Reactor Press., psig | 300 | 300 | 300 | 300 | 300 |
| H$_2$/C$_2$H$_4$ ratio | — | — | 0.0802 | — | 0.0544 |
| Comonomer | — | — | — | butene | butene |
| POLYMER PROPERTIES | | | | | |
| Melt Index | — | 0.09 | — | 0.132 | 0.73 |
| Flow Index | 2.21 | 9.07 | 19.6 | 15.7 | 56.4 |
| Melt Flow Ratio | — | 108.0 | — | 119.0 | 77.2 |
| Density, g./cc. | 0.9592 | 0.9648 | 0.956 | 0.949 | 0.953 |
| Cyclohexane Extractables, % | 1.13 | 4.14 | — | — | — |

Melt index was determined in conformity with ASTM D-1238 at 190° C. and reported in decigrams/minute. Flow index was determined in accordance with ASTM D-1238 at ten times the weight used in the melt index test. Melt flow ratio is defined as the ratio of flow index to melt index.

Cyclohexane extractables were determined by measuring the percent of the ethylene polymer sample which is extracted by refluxing cyclohexane after 18 hours. Cyclohexane extractable figures are an indication of the amounts of low molecular weight polymers formed with a particular catalyst.

Although the invention has been described in its preferred forms with a certain degree of particularity it is understood that the present disclosure of the preferred forms has been made only by way of example and that numerous changes may be resorted to without departing from the spirit and scope of the invention.

What is claimed is:

1. In the method for the catalytic polymerization of ethylene alone or the copolymerization of ethylene with α-olefins containing 3 to 6 carbon atoms, the improvement which comprises using as a catalyst an amount of a silyl chromate having the formula:

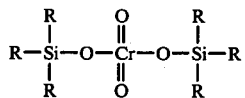

wherein each R is a hydrocarbyl radical containing from 1 to about 14 carbon atoms, deposited onto a high surface area silica support, said support previously heat-treated to a temperature of about 500°–1000° C., containing both aluminum and titanium wherein there is no subsequent activation step.

2. Method claimed in claim 1 wherein the α-olefin is propylene.

3. Method claimed in claim 1 wherein the α-olefin is 1-hexene.

4. Method claimed in claim 1 wherein the α-olefin is 1-butene.

5. Method claimed in claim 1 wherein the catalyst also contains up to about 10% by weight of a fluoridation agent based on the weight of silica.

6. Method claimed in claim 5 wherein the amount of aluminum present is about 0.2 to about 1% by weight, calculated as Al$_2$O$_3$, based on the weight of silica.

7. Method claimed in claim 1 wherein the catalyst contains about 0.2 to about 1% by weight of aluminum calculated as Al$_2$O$_3$, and 2 to about 20% by weight of titanium, calculated as TiO$_2$, all based on the weight of silica.

8. Method claimed in claim 7 wherein the silyl chromate is bis-triphenylsilyl chromate and is present in an amount sufficient to afford about 0.05 to about 2.0 weight % of chromium, calculated as Cr, based on the total weight of catalyst.

* * * * *

UNITED STATES PATENT AND TRADEMARK OFFICE
CERTIFICATE OF CORRECTION

PATENT NO. : 4,152,502
DATED : May 1, 1979
INVENTOR(S) : I. J. Levine et al.

It is certified that error appears in the above-identified patent and that said Letters Patent are hereby corrected as shown below:

Column 3, line 5, "bis-trixylylsilyichromate" should read --bis-trixylylsilylchromate--.

Column 3, line 48, "at" should read --as--.

Column 3, line 63, "1-hexane" should read --1-hexene--.

Column 7, line 34, "MODIFED" should read --MODIFIED--.

Signed and Sealed this

Eighteenth Day of September 1979

[SEAL]

Attest:

LUTRELLE F. PARKER
Attesting Officer    Acting Commissioner of Patents and Trademarks